United States Patent
Wu et al.

(10) Patent No.: US 8,258,741 B2
(45) Date of Patent: Sep. 4, 2012

(54) SOLAR POWER MANAGEMENT SYSTEM

(75) Inventors: Chun-Yi Wu, Hsinchu (TW); Wei-Chih Hsieh, Hsinchu (TW); Wei Hwang, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 316 days.

(21) Appl. No.: 12/832,079

(22) Filed: Jul. 8, 2010

(65) Prior Publication Data

US 2011/0193515 A1 Aug. 11, 2011

(30) Foreign Application Priority Data

Feb. 5, 2010 (TW) ................................ 99103598 A

(51) Int. Cl.
*H01M 10/46* (2006.01)
(52) U.S. Cl. ....................................................... 320/101
(58) Field of Classification Search .................. 320/101, 320/107, 128, 134, 136, 140, 166; 136/291, 136/293; 323/906
See application file for complete search history.

(56) References Cited

U.S. PATENT DOCUMENTS

| | | | |
|---|---|---|---|
| 6,984,970 B2 * | 1/2006 | Capel | 323/299 |
| 2006/0017327 A1 * | 1/2006 | Siri et al. | 307/43 |
| 2007/0182362 A1 | 8/2007 | Trainor et al. | |
| 2009/0078300 A1 * | 3/2009 | Ang et al. | 136/244 |
| 2010/0308662 A1 * | 12/2010 | Schatz et al. | 307/80 |

OTHER PUBLICATIONS

H. Shao et al., "A micro power management system and maximum output power control for solar energy harvesting applications," IEEE ISLPED, pp. 298-303, Aug. 2007, ACM New York, USA.

* cited by examiner

*Primary Examiner* — Edward Tso
(74) *Attorney, Agent, or Firm* — WPAT, P.C.; Anthony King

(57) ABSTRACT

A solar power management system is provided for managing electric energy conversion by a photovoltaic cell module, supplying the converted electric energy to an external load, and storing the converted electric energy in a battery. The solar power management system comprises a multiphase maximum power tracking (MPT) module, a charging circuit, and a voltage conversion module. The multiphase MPT module regulates output current of the photovoltaic cell module to output maximum power within the high limit thereof and obtain improved solar energy conversion efficiency. The voltage conversion module converts the electric energy generated by the photovoltaic cell module into different voltage formats, such as 5.6V DC, 1.0V DC, 0.6~0.3V DC low voltage, or −1.2V DC negative voltage, to meet different external load requirements. The solar power management system has simple circuitry and can be configured as a system on chip (SoC) at reduced cost while provides very wide applications.

7 Claims, 10 Drawing Sheets

SOLAR POWER MANAGEMENT SYSTEM

FIELD OF THE INVENTION

The present invention relates to a solar power management system, and more particularly to a power management system capable of tracking changes in the solar power conversion efficiency of a photovoltaic cell.

BACKGROUND OF THE INVENTION

The consumption of traditional energy resources has caused environmental pollution and drastic changes in global climate, which in turn indirectly leads to the largely increased demands of people for more energy sources. To solve the problem of worldwide energy shortage, all the countries in the world are devoted to the exploitation of alternate energy resources and expect the alternate energy resources can reduce people's demands for the traditional energy resources to thereby solve the worldwide energy crisis. Although solar radiation can be converted into electric energy through solar photovoltaic technology, and light energy from the sun is non-depletable, the currently available sunlight energy conversion efficiency is relatively low. Therefore, scientists make all efforts to work out an effective solution for improving the sunlight energy conversion efficiency.

In a solar photovoltaic system, a photovoltaic (PV) cell is used to convert the solar energy into electric energy for supplying to a load. Alternatively, a plurality of photovoltaic cells can be grouped into several groups. The photovoltaic cells in each group are connected in series and then, all the groups of serially connected photovoltaic cells are connected in parallel to form a photovoltaic cell module (PVCM). Through the connection of the photovoltaic cells in series and in parallel, the electric energy converted from the solar energy can have a predetermined voltage. The electric energy with the predetermined voltage can be supplied to various electric appliances via a voltage converter, or be stored in a battery. No matter the solar photovoltaic system comprises only one single photovoltaic cell or a photovoltaic cell module including a plurality of serially and parallelly connected photovoltaic cells, the generated power would change with the amount of solar radiation collected by the solar photovoltaic system. As a result, the output current and voltage of the solar photovoltaic system is unstable. Further, the voltage converter is designed based on a certain specific input voltage and current. The unstable voltage and current generated by the photovoltaic cell module input to the voltage converter at non-optimal settings in most of the time. Thus, the voltage converter has relatively low power conversion efficiency (PCE). That is, a large amount of solar energy is wasted.

Please refer to FIG. 1. In practical application, after a photovoltaic cell module 91 has generated electric energy, the generated electric energy is converted by a voltage converter (not shown) in a power management system 92 into a low voltage output 921 and a negative voltage output 922 for supplying to an applied circuit 94. Also, the generated electric energy is converted into a high voltage output 923 for supplying to an input/output (I/O) component 95. Furthermore, surplus electric energy is stored in a battery 93. When the electric energy converted from the solar radiation is insufficient, the power management system 92 would cause the electric energy stored in the battery 93 to convert into a suitable voltage for supplying to the applied circuit 94 and/or the I/O component 95.

There are prior art techniques for increasing the power conversion efficiency of the voltage converter. For example, in the thesis by Shao et al. entitled "A Micro Power Management System and Maximum Output Power Control for Solar Energy Harvesting Applications", IEEE International Symposium on Circuits and System (ISCAS) 2007, pp. 298-303, New Orleans, La., USA, 27-30 May 2007, the output power of the voltage converter is tracked and optimized to increase the power conversion efficiency of the voltage converter. However, in implementing the micro power management system as suggested by Shao et al., it is necessary to cope with the input electric energy under various conditions in order to perform the power regulation. Accordingly, the voltage converter for this purpose would have complicated structure, large volume, high manufacturing cost, and can not be suitably applied to small-size electronic products, such as mobile phones, portable computers, and personal digital assistants (PDAs). Moreover, the complicated control circuit of the power management system would consume additional power and could not be suitably applied in the μW-level power management circuit. US Patent Publication No. 20070182362 discloses the use of a supercapacitor to store the electric energy therein and the stored electric energy is coordinately supplied to batteries or external loads. While the way suggested in this patent can be easily achieved, it is still difficult to reduce the cost for a supercapacitor with sufficient capacity. National Semiconductor Corporation, USA announced its SolarMagic™ technology on Jul. 17, 2009. According to the SolarMagic™ technology, the output power of every photovoltaic cell is monitored and optimized to adjust the current direction in the photovoltaic cell and accordingly increase an overall efficiency thereof. That is, the SolarMagic™ technology adopts the technique of control by source. However, since the optimizing strategy is complicated and requires an additional voltage conversion chip, it is very difficult for the power management system based on the SolarMagic™ technology to be configured as a system on chip (SoC).

Presently, the photovoltaic cell has increasingly widened applications, and can be applied to, for example, domestic solar water heaters, solar street lamps, and various types of consumer electronic products and portable electronic products. The demand for photovoltaic cell keeps increasing. Therefore, it is necessary to develop a power management system that has simple structure and effectively enables increased solar power conversion efficiency.

SUMMARY OF THE INVENTION

A primary object of the present invention is to provide a solar power management system for managing the electric energy conversion by a photovoltaic cell, supplying the converted electric energy to an external load, and storing the converted electric energy in a battery. The solar power management system can be configured as, but not limited to, a system on chip (SoC) for connecting to a photovoltaic cell and regulating the power output by the photovoltaic cell to a maximum power. To achieve this object, the solar power management system according to the present invention comprises a maximum power tracking (MPT) circuit, a charging circuit, and a voltage conversion module. The MPT circuit regulates the output current of the photovoltaic cell, so that the photovoltaic cell can output the maximum power without exceeding the high limit. The MPT circuit is formed from a voltage regulating circuit, a voltage comparison circuit, and a phase inverter circuit. The voltage comparison circuit compares two voltages converted from the output current of the photovoltaic cell in two adjacent clocks and provides a comparison voltage, which is fed back by the phase inverter circuit to the voltage regulating circuit as a setting voltage. Next, the voltage regulating circuit regulates the output power of the photovoltaic cell to the maximum power. The electric energy output by the photovoltaic cell is either used by the charging circuit to charge a battery or converted by the voltage conversion module into a setting voltage format for supplying to an external load. The setting voltage format can be 5.6V DC for use by an external I/O circuit or for charging a lithium battery, 0.7V~1.0V DC for use by an external circuit, or a low voltage of 0.6V~0.3V DC; or, the setting voltage format can be a −1.2V DC negative voltage generated by a negative voltage supply circuit.

Another object of the present invention is to provide a solar power management system for managing the electric energy conversion by a photovoltaic cell module, supplying the converted electric energy to an external load, and storing the converted electric energy in a battery. The photovoltaic cell module can be formed from a plurality of photovoltaic cells connected in parallel or in series-parallel connection. The solar power management system can be connected to the photovoltaic cell module to regulate the power output by the photovoltaic cell module to a maximum power. To achieve this object, the solar power management system according to the present invention comprises a multiphase maximum power tracking (MPT) module, a charging circuit, a first voltage supply circuit, a second voltage supply circuit, a third voltage supply circuit, and a negative voltage supply circuit. The multiphase MPT module is formed from a plurality of MPT circuits respectively corresponding to the photovoltaic cells and regulates the output current of the photovoltaic cell module, so that the photovoltaic cell module can output the maximum power without exceeding the high limit. The first voltage supply circuit outputs a voltage in the format of 5.6V DC for use by an external I/O circuit or charging a lithium battery; the second voltage supply circuit outputs a voltage in the format of 0.7V~1.0V DC for use by an external circuit; the negative voltage supply circuit generates a negative voltage in the format of −1.2V DC; and the third voltage supply circuit generates a low voltage of 0.6V~0.3V DC. The third voltage supply circuit comprises a comparison circuit, a finite-state machine, and a switched-capacitor DC-DC converter. The finite-state machine outputs a control signal to the switched-capacitor DC-DC converter, so that the latter alternately switches between a first switched capacitor matrix and a second switched capacitor matrix thereof to regulate and obtain a voltage of below 0.7V DC, such as a voltage ranged between 0.6V DC and 0.3V DC for outputting to an external load.

With the above arrangements, the solar power management system according to the present invention has one or more of the following advantages:

(1) The solar power management system can regulate the photovoltaic cell or the photovoltaic cell module to a maximum power and thereby improves the drawback in the prior art that only regulates the solar power management system to output a maximum power. Thus, the photovoltaic cell or the photovoltaic cell module can output the maximum power without exceeding the high limit.

(2) The solar power management system integrates a voltage conversion module thereinto and can be configured as a system on chip (SoC) without the need of providing additional voltage conversion chip. And, with the voltage conversion module, a low voltage of below 0.7V DC can be generated without the need of providing additional voltage conversion chip as in the prior art.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 6:
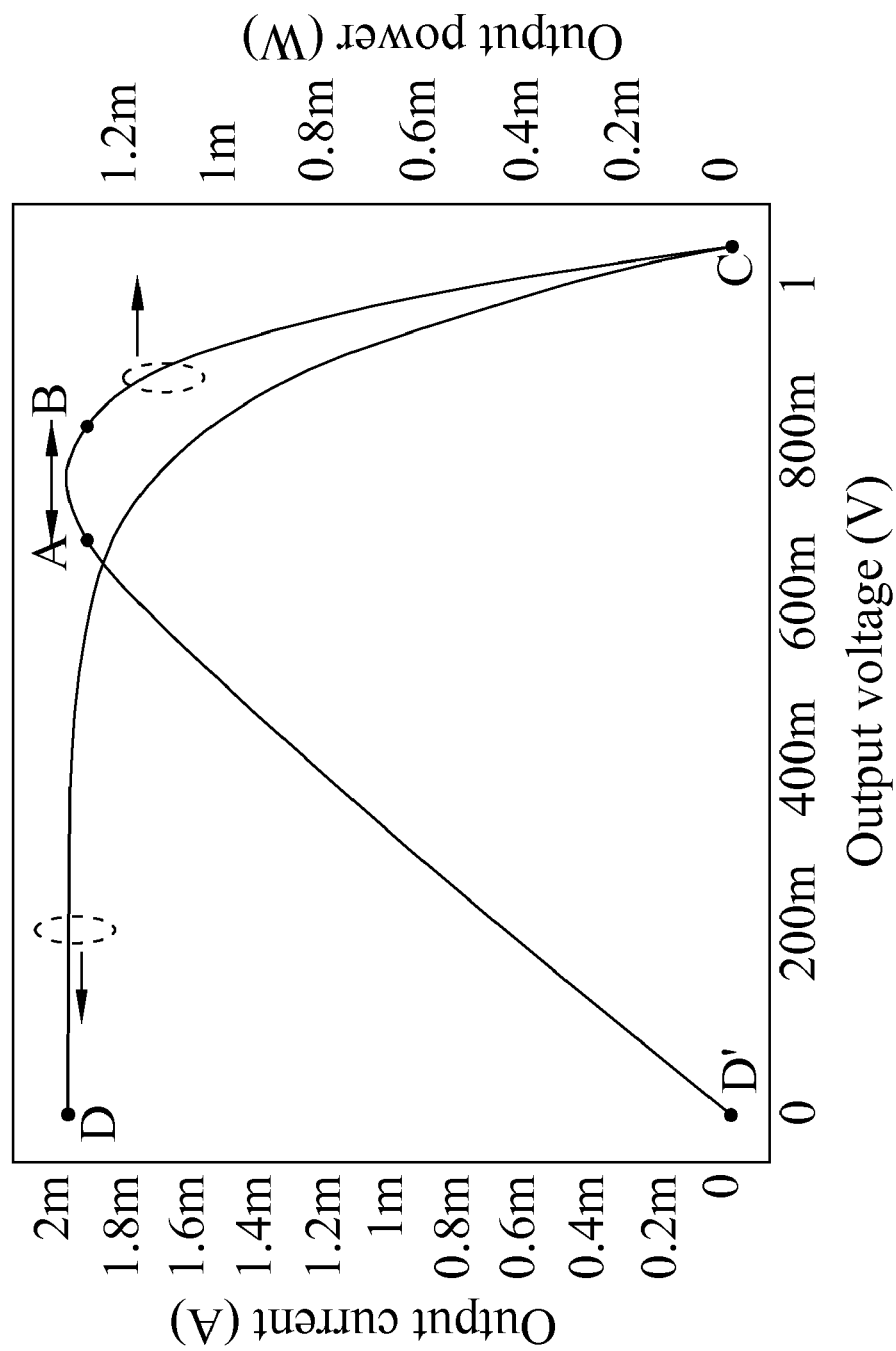
FIG. 6 shows voltage-current and voltage-power output curves of a PV cell, and how the solar power management system of the present invention brings the PV cell to output a maximum power.

A photovoltaic cell is manufactured by utilizing the photovoltaic effect of semiconductor materials. Photovoltaic effect means a phenomenon that occurs when semiconductor materials absorb light energy and photons create electron-hole pairs in the semiconductor materials, and an electromotive force is generated when the electron-hole pairs are separated. The photovoltaic cell has current-voltage (I-V) characteristics that vary with sunlight intensity S (W/m$^2$) and cell temperature T (° C.). That is, I=f(V, S, T), which can be expressed as the following equations:

$$I = I_L - I_0 \left\{ \exp\left[\frac{q(V + IR_e)}{AKT}\right] - 1 \right\} - \frac{V + IR_e}{R_h} \quad (1)$$

$$I_d = I_0 \left\{ \exp\left[\frac{q(V + IR_e)}{AKT}\right] - 1 \right\} \quad (2)$$

where, $I_d$ is diode current (A), $I_L$ is photovoltaic current (A), $I_0$ is reverse saturation current, q is electron charge (1.6×10$^{-19}$C), K is Boltzmann constant (1.38×10$^{-23}$J/K), T is absolute temperature (T=t+273K), A is diode quality factor (which is about 2.80±0.152 when T=330K), $R_e$ is equivalent series resistance (ESR), and $R_h$ is parallel resistance. Please refer to FIG. 6, in which curves C-D and C-D' are shown. In FIG. 6, the curve C-D indicates that output current (A) gradually increases (corresponding to the output currents (A) marked on the y-axis at the left side of FIG. 6) when output voltage (V) is lowered. That is, when the output voltage of the photovoltaic cell is relatively low, the output current does not show significant changes with changes in the voltage, and the photovoltaic cell at this point is similar to a constant current source. The curve C-D in FIG. 6 also indicates the current decreased drastically when the voltage exceeds a critical value and keeps increasing, and the photovoltaic cell at this point is similar to a constant voltage source. However, as being affected by the temperature T and interfered by the diode itself as well as a back-end voltage conversion module, there would have a range formed by the output current (A). Similarly, the curve C-D' in FIG. 6 indicates that the output power of the photovoltaic cell gradually increases (corresponding to the output powers (W) marked on the y-axis at the right side of FIG. 6) from a smaller level (point D') with the rising of the output voltage to reach at a maximum output power point (between points A and B as shown in FIG. 6), and the output power (W) would have a range formed therein. However, as being affected by the temperature T and interfered by the diode itself, the power generated by the photovoltaic cell would have a range existed therein at any instantaneous time, which would result in an output power not equal to the maximum output power point to adversely affect the solar energy conversion efficiency of the photovoltaic cell. The present invention provides a solar power management system that utilizes a maximum power tracking (MPT) circuit to track the voltage generated by the output current of a photovoltaic cell and accordingly regulates the output power of the photovoltaic cell to a maximum. When a plurality of photovoltaic cells are used to form a photovoltaic cell module, the MPT circuits respectively corresponding to the photovoltaic cells together constitute an MPT module for tracking the voltages generated by the output currents of the photovoltaic cell module and regulating the output powers of the photovoltaic cell module to a maximum output power thereof.

The present invention will now be described with some preferred embodiments thereof. For the purpose of easy to understand, elements that are the same in the preferred embodiments are denoted by the same reference numerals.

First Embodiment

Figure 1:
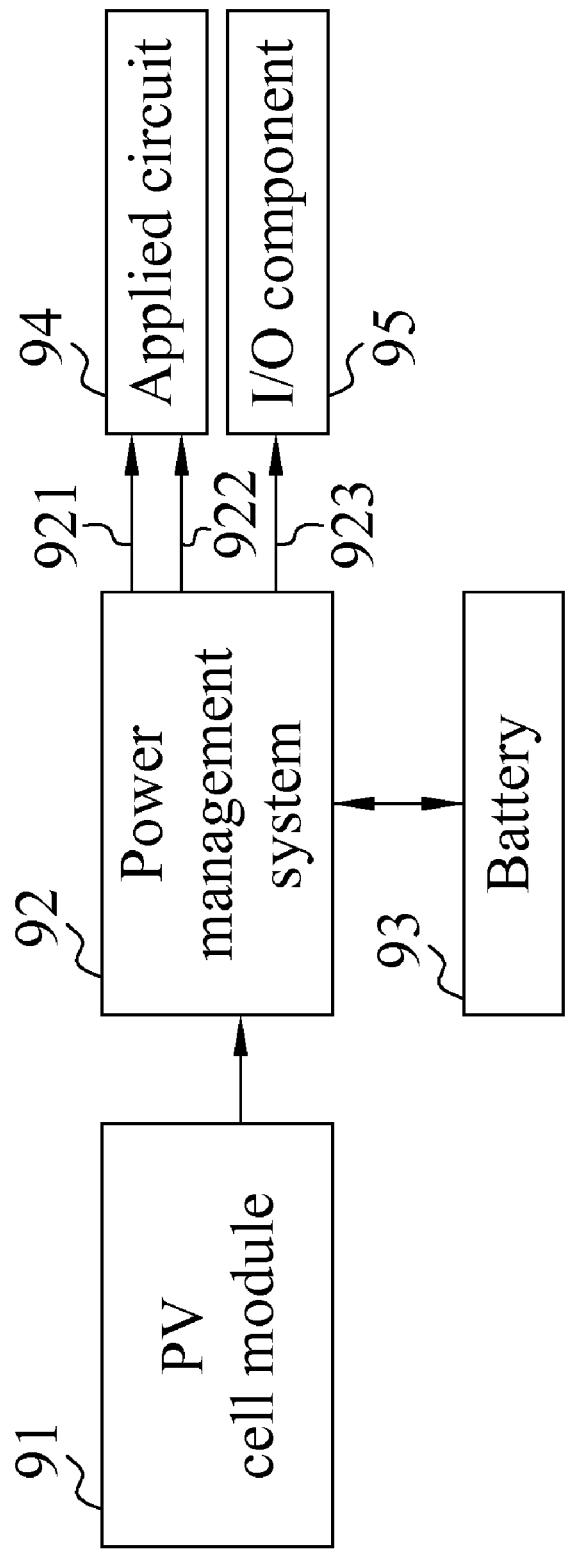
FIG. 1 is a block diagram of a prior art power management system for a photovoltaic (PV) cell module.
Figure 2:
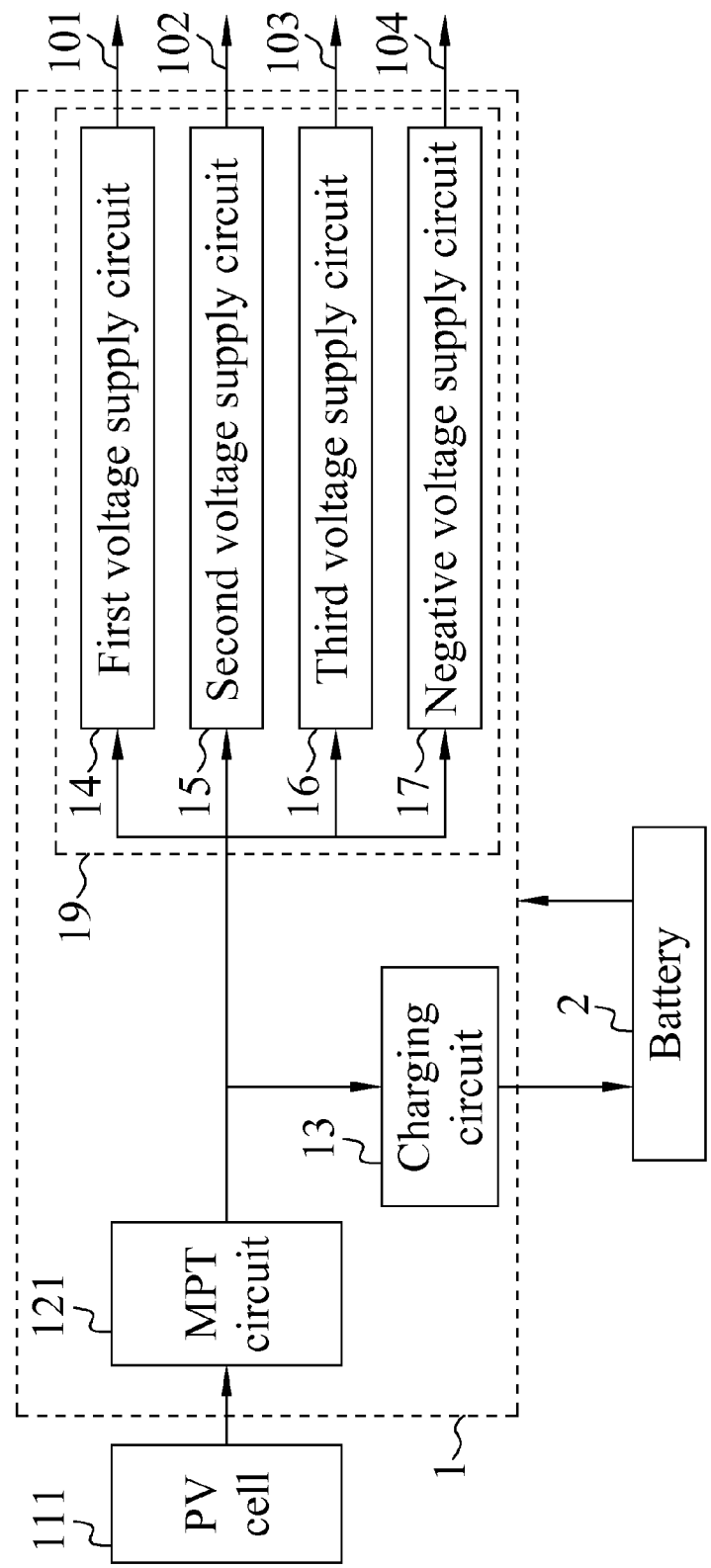
FIG. 2 is a block diagram of a solar power management system according to a first and a second embodiment of the present invention.

Please refer to FIG. 2 that is a block diagram of a solar power management system 1 according to a first embodiment of the present invention. As shown, the solar power management system 1 is manufactured as a system on chip (SoC) and is connected to an output end of a photovoltaic cell 111 for managing the electric energy conversion by the photovoltaic cell 111, supplying the converted electric energy to an external load, and storing surplus electric energy in a battery 2. The solar power management system 1 comprises a maximum power tracking (MPT) circuit 121, a charging circuit 13, and a voltage conversion module 19. The MPT circuit 121 causes the photovoltaic cell 111 to output electric energy with a maximum power, and the voltage conversion module 19 converts the electric energy with the maximum power into a setting voltage for use by an external load. In the illustrated first embodiment, the voltage conversion module 19 comprises a first voltage supply circuit 14, a second voltage supply circuit 15, a third voltage supply circuit 16, and a negative voltage supply circuit 17. The first voltage supply circuit 14 converts the electric energy with the maximum power output by the photovoltaic cell 111 into a first voltage output 101, which is 5.6V DC for an external I/O circuit or for charging a lithium battery. The second voltage supply circuit 15 converts the electric energy with the maximum power output by the photovoltaic cell 111 into a second voltage output 102, which is 0.7V~1.0V DC for external circuits. The third voltage supply circuit 16 converts the electric energy with the maximum power output by the photovoltaic cell 111 into a third voltage output 103 of low-current below 0.7V DC, such as 0.6V~0.3V DC for an external low-voltage load. The negative voltage supply circuit 17 converts the electric energy with the maximum power output by the photovoltaic cell 111 into a negative voltage output 104, which is a negative voltage of −1.2V DC for external circuits. The first voltage supply circuit 14, the second voltage supply circuit 15, the third voltage supply circuit 16, the negative voltage supply circuit 17, and the charging circuit 13 can be configured using conventional circuitries. For example, the first voltage supply circuit 14 can be configured by referring to the circuit topologies taught by Ker et al. in "Design of charge pump circuit with consideration of gate-oxide reliability in low-voltage CMOS processes", IEEE J. Solid-State Circuits, Vol. 41, No. 5, pp 1100-1107, May 2006.

Figure 4:
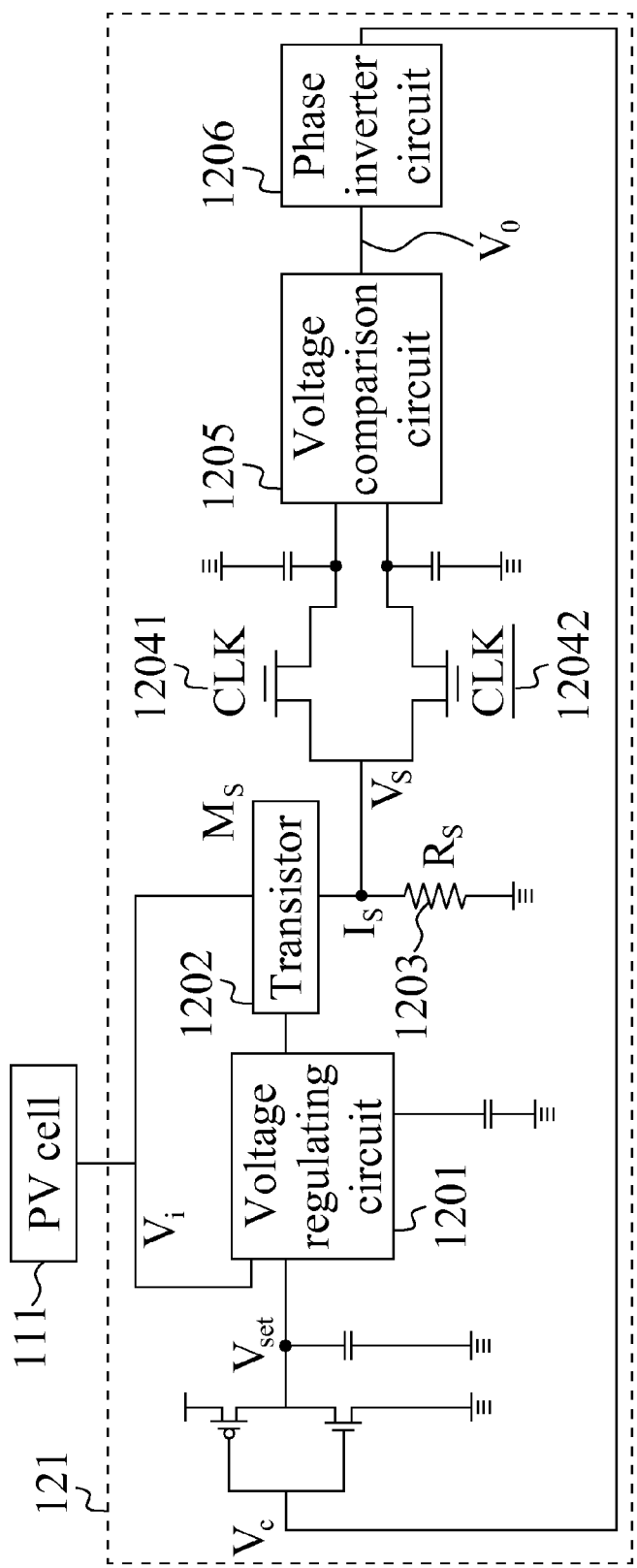
FIG. 4 schematically shows a maximum power tracking circuit for the solar power management system of the present invention.
Figure 8:
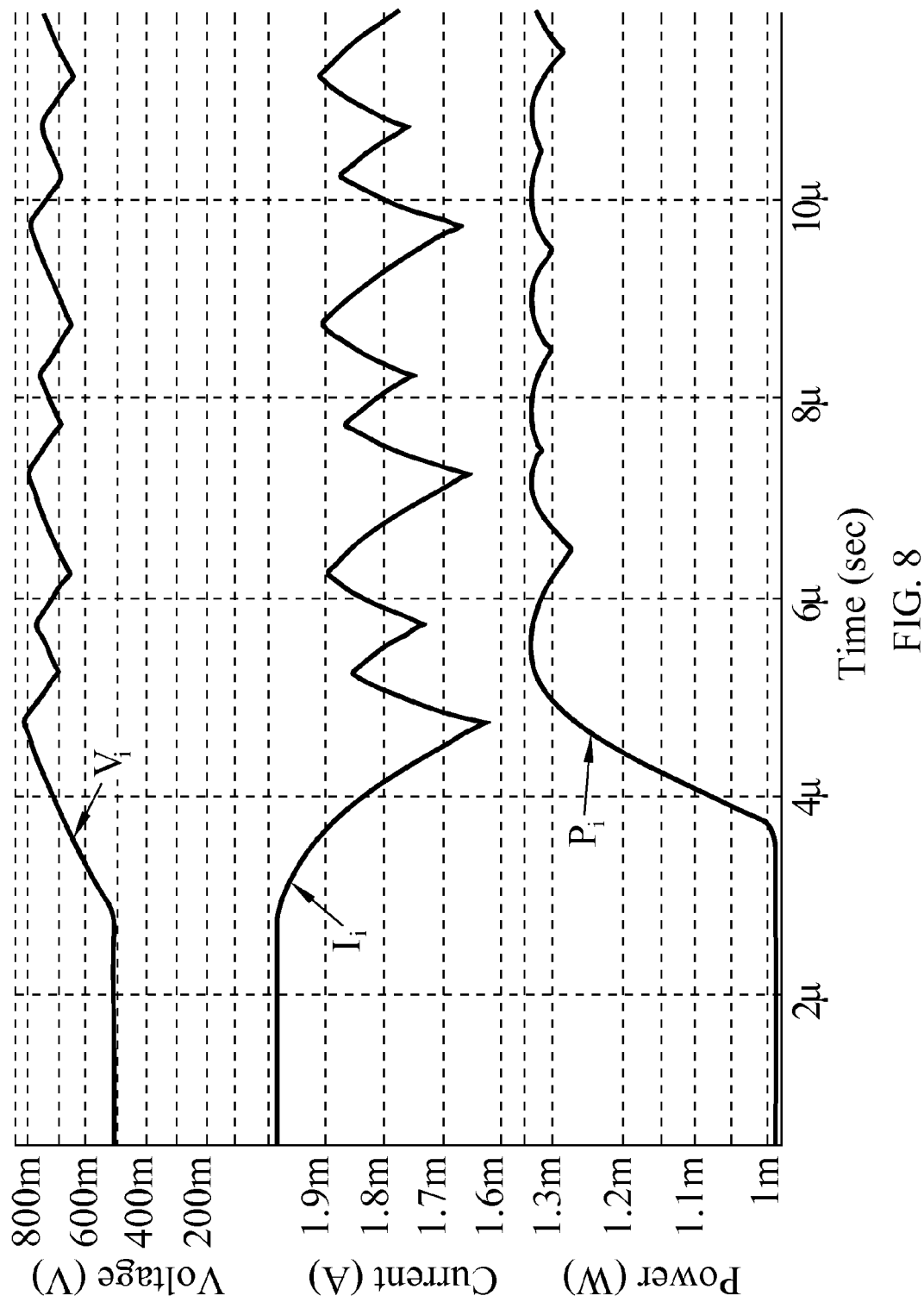
FIG. 8 shows voltage-time, current-time, and power-time curves of the voltage, current, and power outputs by a PV cell connected to the solar power management system according to the first embodiment of the present invention.

As can be seen from FIG. 4, the MPT circuit 121 comprises a voltage regulating circuit 1201, a voltage comparison circuit 1205, and a phase inverter circuit 1206. When the photovoltaic cell 111 has generated electric energy (voltage Vi), current Is of the photovoltaic cell 111 can be generated via a transistor (Ms) 1202. The current Is passes through a resistor (Rs) 1203 to generate a voltage across resistor Vs on the resistor (Rs) 1203. Samples of the voltage across resistor Vs are taken in a clock signal (CLK) 12041 or a phase-inverted clock signal (CLK) 12042, and the voltage comparison circuit 1205 compares the relative size of the voltage samples taken in two adjacent clocks. The comparison result $V_0$ is logic high ("1") or logic low ("0"). Then, the phase inverter circuit 1206 feeds back a voltage Vc, which forms a setting voltage $V_{set}$ to be tracked. The voltage regulating circuit 1201 regulates of the photovoltaic voltage Vi to be equal to the setting voltage $V_{set}$ and thereby changes the current of the photovoltaic cell 111. By repeating the above procedures, the photovoltaic cell 111 can be brought to output the maximum output power. The first embodiment can be further described with reference to FIG. 6. Through regulation by the MPT circuit 121 in every clock, the output power of the photovoltaic cell 111 is regulated to a range between the points A and B, i.e., the maximum power output of the photovoltaic cell 111, without exceeding the high limit thereof. FIG. 8 shows the output current (A), the output voltage (V) and the output power (W) of the photovoltaic cell 111 after being managed with the solar power management system 1 according to the first embodiment of the present invention. As shown, since current Ii changes with sunlight and output voltage, the MPT circuit 121 regulates the output voltage Vi so that the output power Pi (Pi=Ii×Vi) is stable and close to the maximum value thereof. With the output power Pi in a stable state and close to its maximum value, the charging circuit 13 can charge the battery 2 and the voltage conversion module 19 can convert the PV cell current Is into different voltages all in the optimal working range, so that the voltage conversion module 19 can maintain the best conversion efficiency (under the optimal PCE condition) to thereby improve the conversion efficiency of the solar photovoltaic system.

Second Embodiment

The solar power management system 1 according to the second embodiment of the present invention is structurally similar to the first embodiment as shown in FIG. 2, and comprises an MPT circuit 121, a charging circuit 13, and a voltage conversion module 19. The voltage conversion module 19 further comprises a first voltage supply circuit 14, a second voltage supply circuit 15, a third voltage supply circuit 16, and a negative voltage supply circuit 17. Please refer to FIG. 5. The third voltage supply circuit 16 comprises a comparison circuit 1601, a finite-state machine 1602, and a switched-capacitor DC-DC converter 1603. The switched-capacitor DC-DC converter 1603 further comprises a first switched capacitor matrix 16031 and a second switched capacitor matrix 16032. The comparison circuit 1601 compares a reference voltage Vref with a feedback voltage Vout for the finite-state machine 1602 to output a control signal according to a comparison result from the comparison circuit 1601, so that the switched-capacitor DC-DC converter 1603 alternately switches between the first switched capacitor matrix 16031 and the second switched capacitor matrix 16032 in order to regulate and obtain a third voltage output 103 of below 0.7V DC for outputting to an external load for use.

The third voltage output 103 is defined by $T_0$ and $T_1$. Different combinations of the high level (represented by 1) and the low level (represented by 0) of $T_0$ and $T_1$ allow the third voltage output 103 to have different voltage ranges, as shown in Table 1. While the second embodiment of the present invention applies the combinations shown in Table 1, it is understood the Table 1 is not intended to limit the present invention in any way.

TABLE 1

Different Combinations of $T_0$ and $T_1$ and Corresponding Ranges of the Third Voltage Output

| $T_0$ | $T_1$ | Third Voltage Output |
|---|---|---|
| 0 | 1 | 0.6 V~0.5 V |
| 1 | 1 | 0.4 V~0.3 V |
| 1 | 0 | 0.3 V (Standby) |
| 0 | 0 | Cut off voltage output |

Figure 5:
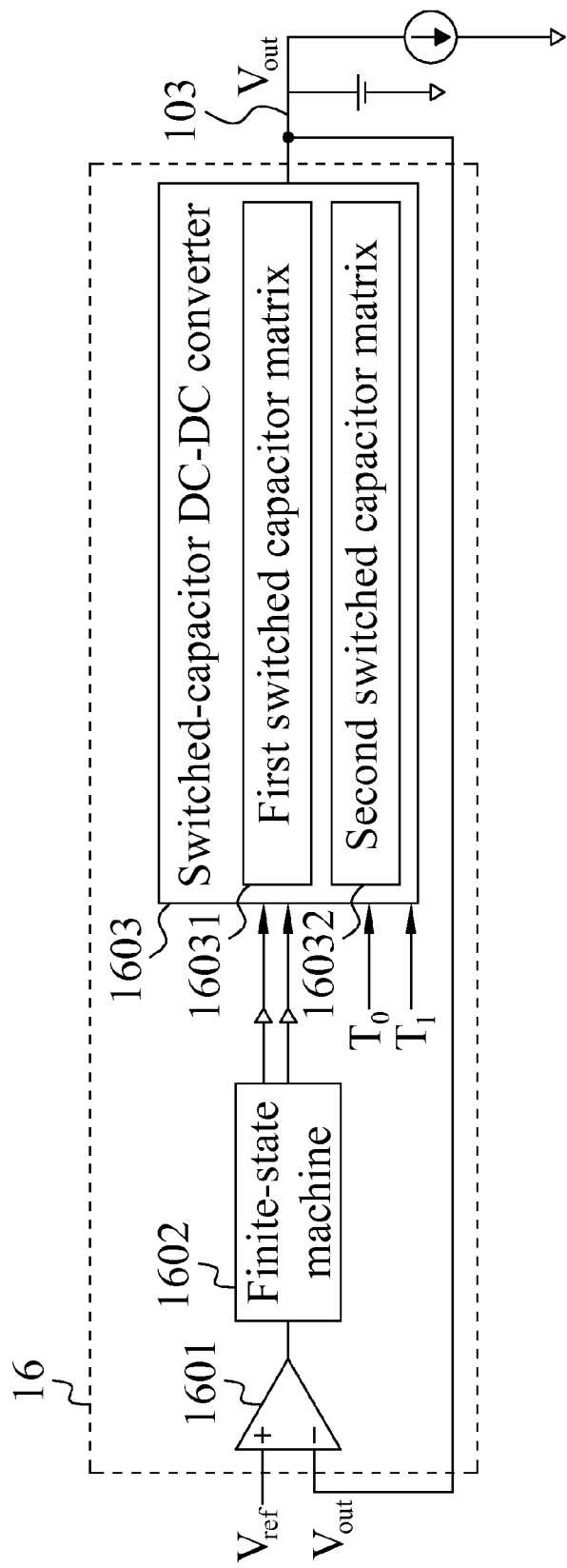
FIG. 5 schematically shows a third voltage supply circuit for the solar power management system of the present invention.
Figure 7:
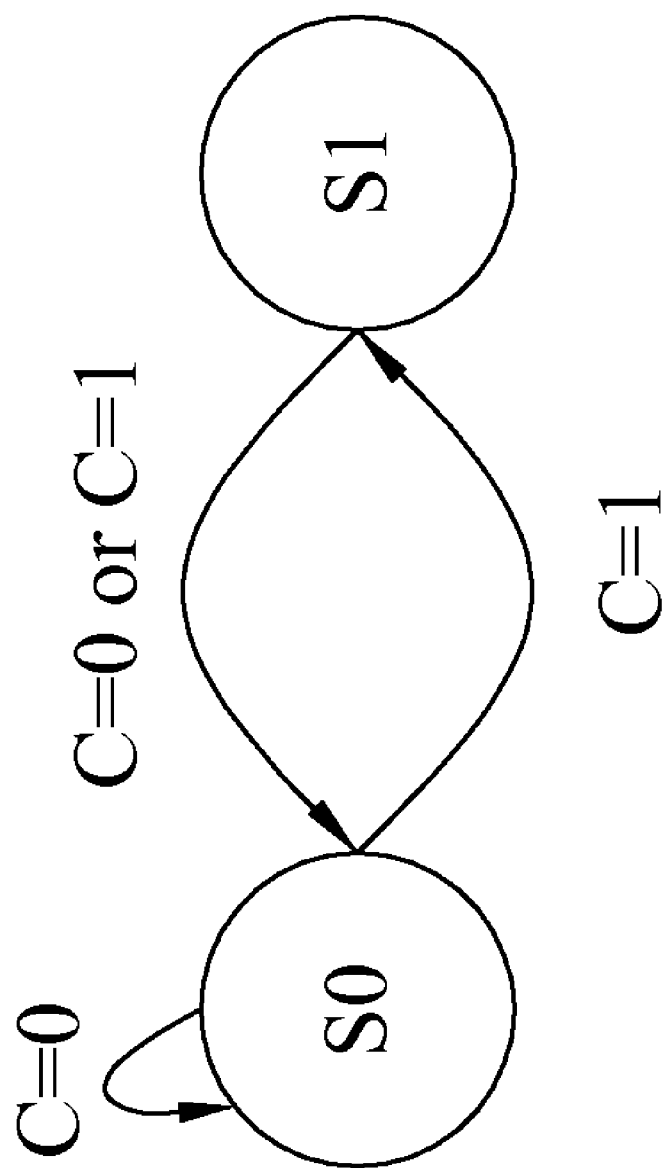
FIG. 7 shows how an finite-state machine controls the outputs of a switched-capacitor DC-DC converter in the solar power management system of the present invention.

Please refer to FIGS. 5 and 7. The switched-capacitor DC-DC converter 1603 comprises a first switched capacitor matrix 16031 and a second switched capacitor matrix 16032. As can be seen in FIG. 7, in a state S0, the first switched capacitor matrix 16031 supplies electric energy for outputting to an external load while the second switched capacitor matrix 16032 accumulates and stores the electric energy from the circuit; and in a state S1, the second switched capacitor matrix 16032 supplies electric energy for outputting to an external load while the first switched capacitor matrix 16031 accumulates and stores the electric energy from the circuit. The first switched capacitor matrix 16031 and the second switched capacitor matrix 16032 are controlled by the finite-state machine 1602. When the voltage Vout is smaller than the reference voltage Vref, the output of the finite-state machine 1602 turns from low level to high level (C=1), as shown in FIG. 7, and the state is switched from S0 to S1. When the output of the finite-state machine 1602 keeps in high level (C=1), the state is alternately switched to S0 and S1. When the voltage Vout is larger than the reference voltage Vref, the output of the finite-state machine 1602 turns from high level to low level (C=0), and the state is switched from S1 to S0. And, when the output of the finite-state machine 1602 keeps in low level (C=0), the state is maintained at S1.

Third Embodiment

Figure 3:
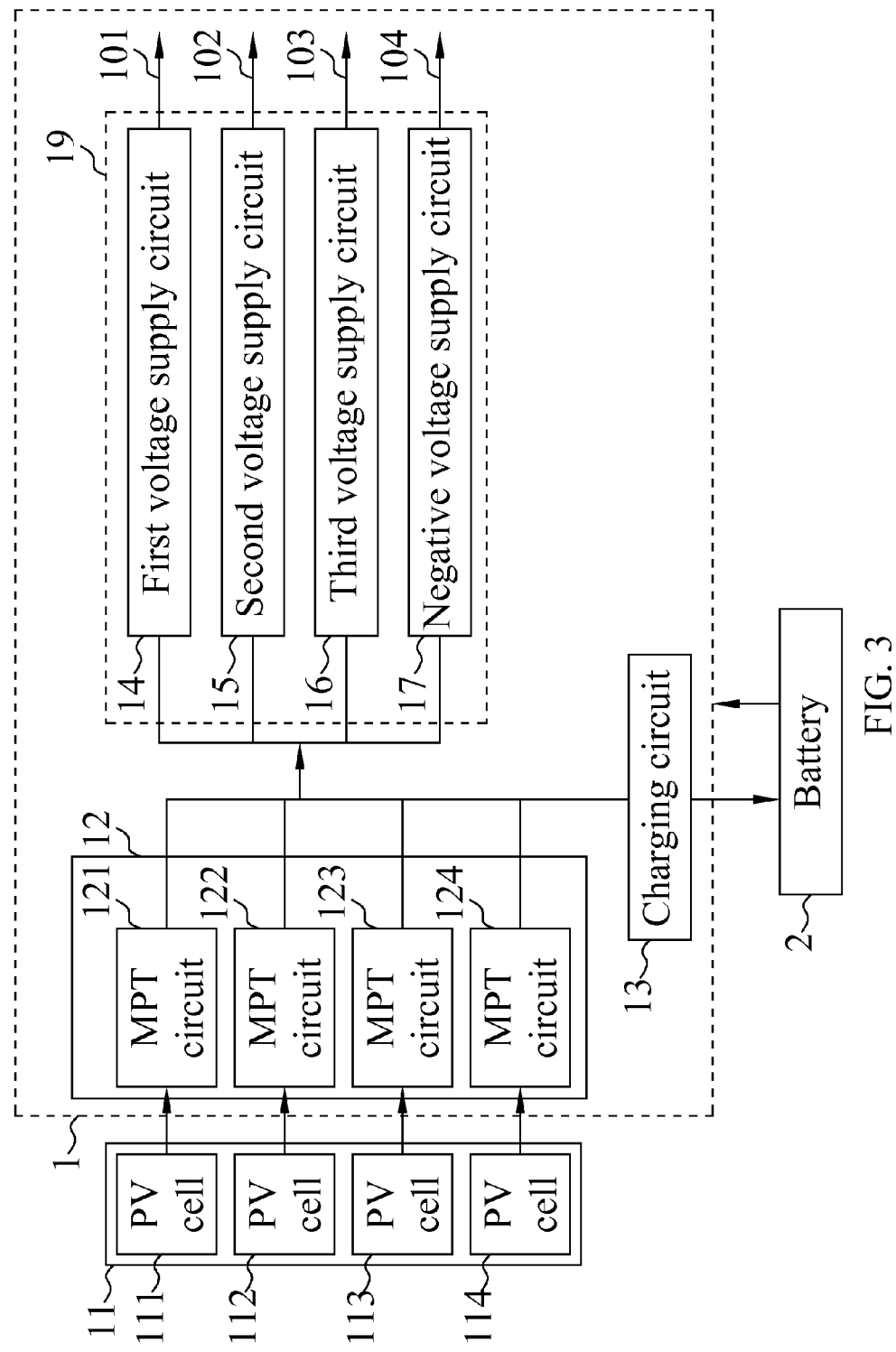
FIG. 3 is a block diagram of a solar power management system according to a third embodiment of the present invention.

Please refer to FIG. 3 that is a block diagram of a solar power management system 1 according to a third embodiment of the present invention for use with a photovoltaic cell module 11. In the illustrated third embodiment, the photovoltaic cell module 11 comprises four photovoltaic cells 111, 112, 113, 114, which are connected in parallel to form an array. However, it is understood the number and the connecting manner (in parallel or in series) of the photovoltaic cells included in the photovoltaic cell module 11 are not necessarily restricted to the above mentioned number and connecting manner. The solar power management system 1 in the third embodiment comprises four MPT circuits 121, 122, 123, 124; a charging circuit 13; and a voltage conversion module 19. The four MPT circuits 121, 122, 123, 124 together constitute a multiphase maximum power tracking (MPT) module 12, and respectively correspond to the four photovoltaic cells 111, 112, 113, 114. Further, the four MPT circuits 121, 122, 123, 124 are connected in parallel to increase the current and accordingly the power generated by the photovoltaic cells 111, 112, 113, 114. The current is supplied to the voltage conversion module 19 for outputting to an external load and supplied to the charging circuit 13 for charging the battery 2.

The MPT circuits 121, 122, 123, 124 of the multiphase MPT module 12 are similar to the MPT circuit in the first embodiment as shown in FIG. 4. That is, the MPT circuit 121 comprises a voltage regulating circuit 1201, a voltage comparison circuit 1205, and a phase inverter circuit 1206. Since the MPT circuits 122, 123, 124 are similar to the MPT circuit 121, the description thereof is omitted herein. When the photovoltaic cell 111 has generated electric energy (voltage Vi), current Is of the photovoltaic cell 111 can be generated via a transistor (Ms) 1202. The current Is passes through a resistor (Rs) 1203 to generate a voltage across resistor Vs on the resistor (Rs) 1203. Samples of the voltage across resistor Vs are taken in two adjacent clock signals (CLK and $\overline{\text{CLK}}$) 12041, 12042, and the voltage comparison circuit 1205 compares the relative size of the voltage samples taken in the two adjacent clocks. The comparison result $V_0$ is logic high ("1") or logic low ("0"). Then, the phase inverter circuit 1206 feeds back a voltage Vc, which forms a setting voltage $V_{set}$ to be tracked. The voltage regulating circuit 1201 regulates the photovoltaic voltage Vi to be equal to the setting voltage $V_{set}$ and thereby changes the current of the photovoltaic cell 111. By repeating the above procedures, the photovoltaic cell 111 can be brought to output the maximum output power thereof. The third embodiment can be further described with reference to FIG. 6. Through the regulation of the photovoltaic cells 111, 112, 113, 114 respectively by the MPT circuits 121, 122, 123, 124 in every clock, the output powers of the photovoltaic cells 111, 112, 113, 114 are regulated to a range between the points A and B, i.e., the maximum power output of the photovoltaic cell module 11, without exceeding the high limit thereof.

In the third embodiment, the voltage conversion module 19 comprises a first voltage supply circuit 14, a second voltage circuit 15, a third voltage supply circuit 16, and a negative voltage supply circuit 17 for converting the electric energy with the maximum power output by the photovoltaic cell 111 into a first voltage output 101 of 5.6V DC, a second voltage output 102 of 0.7~1.0V DC, a third voltage output 103 of low-current below 0.7V DC, and a negative voltage output 104 of −1.2V DC, respectively. Since the third voltage supply circuit 16 in the third embodiment is similar to that in the second embodiment, it is not repeatedly described in details herein.

Figure 10:
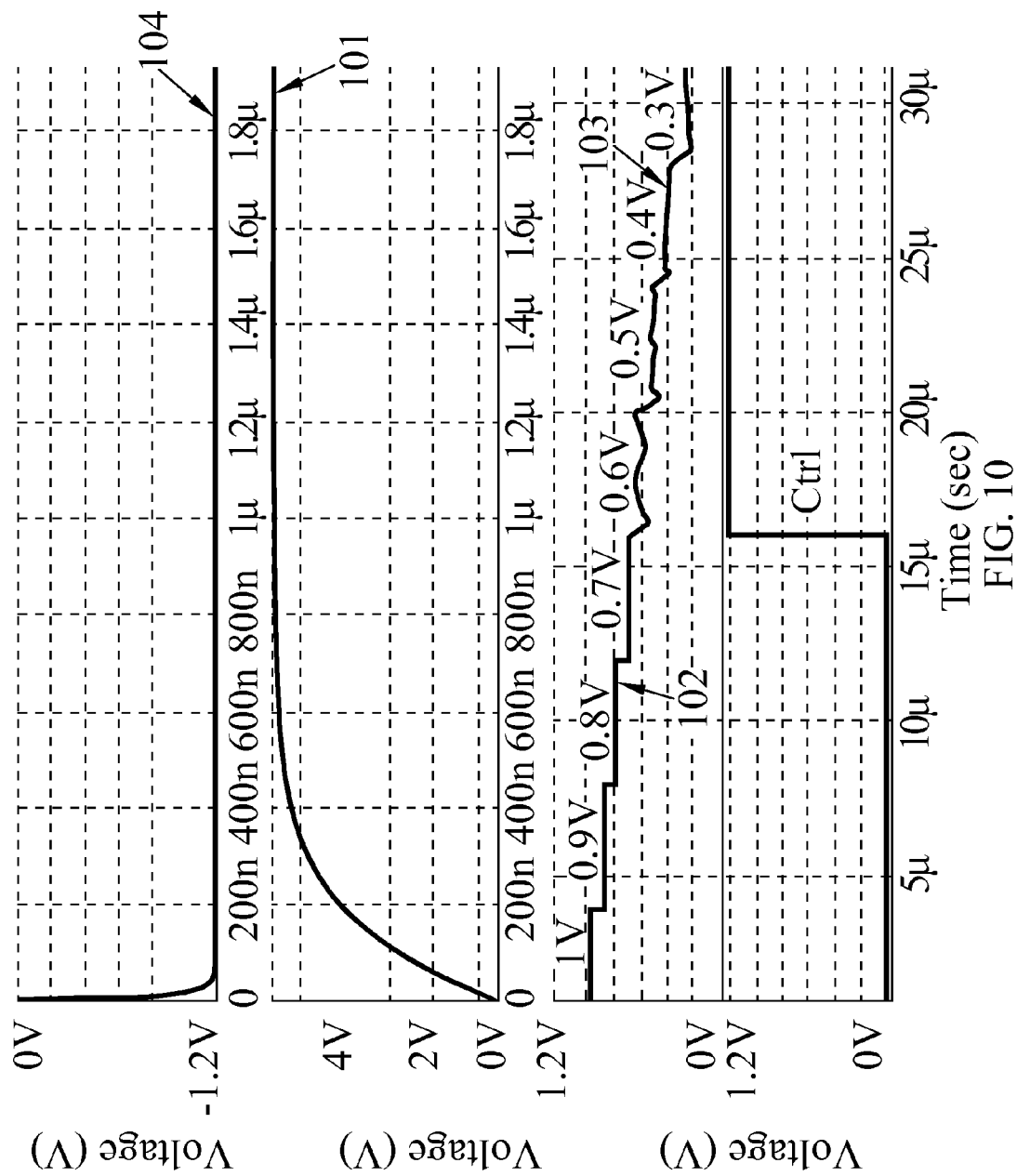
FIG. 10 shows voltage-time curves of the first voltage output, the second voltage output, the third voltage output, and the negative voltage output of the solar power management system according to the third embodiment of the present invention.

FIG. 10 shows outputs of the solar power management system 1 according to the third embodiment of the present invention. The negative voltage output 104 and the first voltage output 101 quickly reach at stable output. When different reference voltages are set, the second voltage output 102 is regulated from 1V, 0.9V, 0.8V to 0.7V corresponding to different reference voltages. When a signal Ctrl for controlling the outputting of the third voltage output 103 changes from low level to high level, it enables the third voltage supply circuit 16. And, the third voltage output 103 of the third voltage supply circuit 16 is regulated from 0.6V, 0.5V, 0.4V to 0.3V corresponding to different reference voltages.

Figure 9:
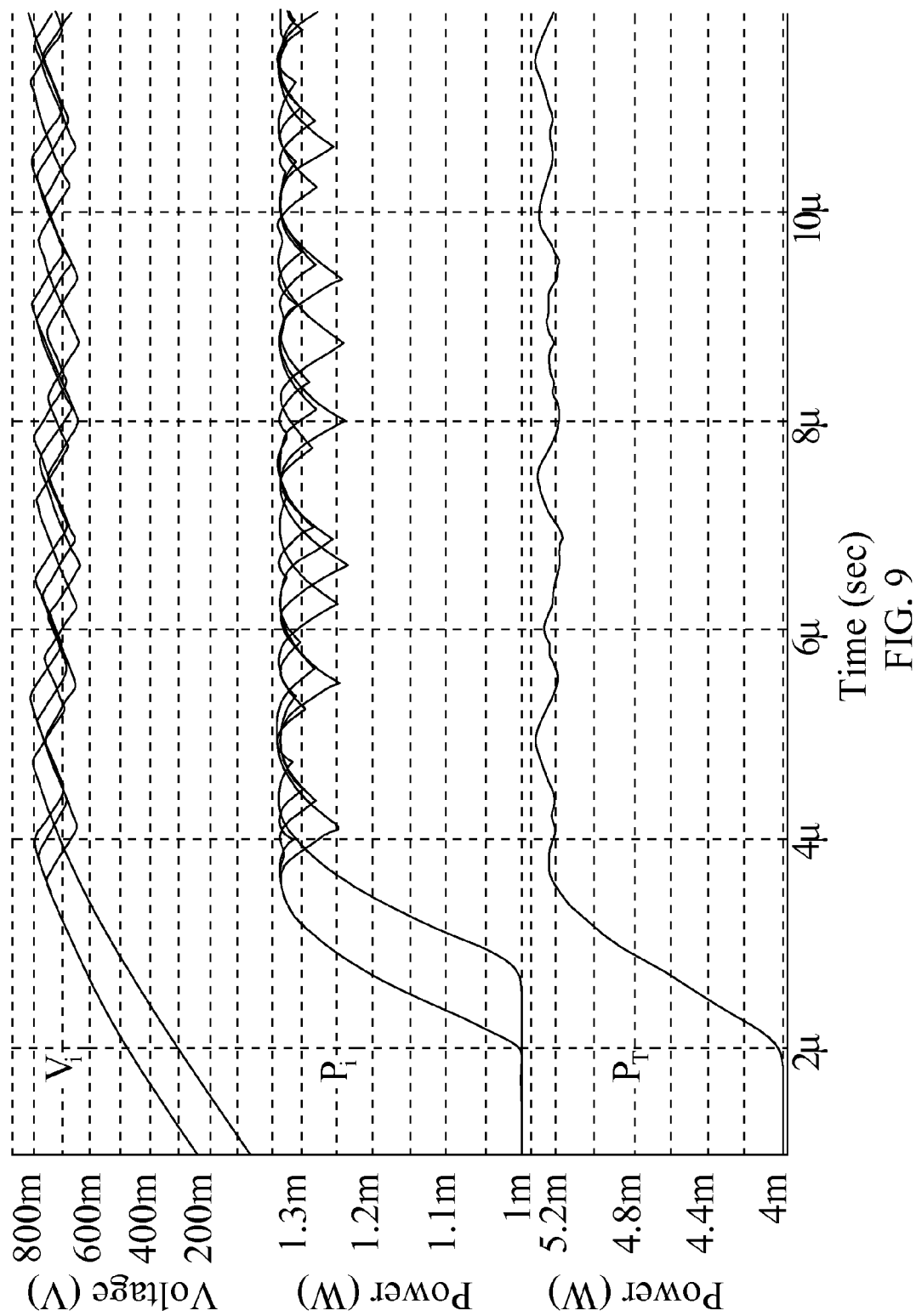
FIG. 9 shows voltage-time, and power-time curves of the voltage, and power outputs by a PV cell module connected to the solar power management system according to the third embodiment of the present invention.

FIG. 9 shows the output current Ii (i=1~4) and the output voltage Vi (i=1~4) of the four photovoltaic cells 111, 112, 113, 114 of the photovoltaic cell module 11 after management by the solar power management system 1 of the present invention. As shown, the current Ii of each of the photovoltaic cells 111, 112, 113, 114 changes with sunlight or is affected by temperature, and the four MPT circuits 121, 122, 123, 124 of the multiphase MPT module 12 respectively regulate the output voltage Vi of the four photovoltaic cells 111, 112, 113, 114 so that a total output power $P_T$ of the photovoltaic cell module 11 is stable and close to the maximum value thereof. The parallel connection of the photovoltaic cells 111, 112, 113, 114 to one another and the regulation of the output of the voltage Vi by the MPT circuits 121, 122, 123, 124 complement with each other for the total output power $P_T$ to be more stable, allowing the charging circuit 13 to charge the battery 2 and the voltage conversion module 19 to convert the electric energy generated by the photovoltaic cell module 11 into different voltages all in the optimal working range, so that the conversion efficiency of the solar photovoltaic system can be improved.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A solar power management system for managing an electric energy conversion by a photovoltaic cell, supplying a converted electric energy to an external load, and storing the converted electric energy in a battery; the solar power management system comprising:
    a maximum power tracking (MPT) circuit receiving the electric energy converted by the photovoltaic cell and regulating an output current of the photovoltaic cell to regulate an output power of the photovoltaic cell, and the MPT circuit comprising:
        a voltage comparison circuit comparing two voltage samples converted from the output current of the photovoltaic cell in two adjacent clocks and providing a comparison voltage;
        a phase inverter circuit changing a phase of the comparison voltage provided by the voltage comparison circuit; and
        a voltage regulating circuit regulating an output electric energy to a setting voltage;
    a charging circuit converting the output electric energy from the MPT circuit into a predetermined charging current and a predetermined charging voltage for charging the battery; and
    a voltage conversion module converting the output electric energy from the MPT circuit into a setting voltage format for outputting to the external load;
wherein the phase inverter circuit outputs a phase-inverted voltage to the voltage regulating circuit as the setting voltage.

2. The solar power management system as claimed in claim 1, wherein the voltage conversion module further comprises a negative voltage supply circuit for producing a preset negative voltage output for outputting to the external load.

3. The solar power management system as claimed in claim 1, wherein the voltage regulating circuit of the MPT circuit regulates the output electric energy of the photovoltaic cell to a maximum power.

4. A solar power management system for managing an electric energy conversion by a photovoltaic cell module formed from a plurality of photovoltaic cells, supplying a converted electric energy to an external load, and storing the converted electric energy in a battery; the solar power management system comprising:
    a multiphase maximum power tracking (MPT) module being formed from a plurality of MPT circuits which respectively correspond to the plurality of photovoltaic cells, for receiving the electric energy converted by the photovoltaic cell module and regulating an output current of the photovoltaic cell module to regulate an output power of the photovoltaic cell module, and each of the MPT circuits comprising:
        a voltage comparison circuit comparing two voltage samples converted from the output current of the photovoltaic cell module in two adjacent clocks and providing a comparison voltage;
        a phase inverter circuit changing a phase of the comparison voltage provided by the voltage comparison circuit; and
        a voltage regulating circuit regulating an output electric energy to a setting voltage;
    a charging circuit converting the output electric energy from the MPT circuits into a predetermined charging current and a predetermined charging voltage for charging the battery;
    a first voltage supply circuit converting the output electric energy from the MPT circuits into a first voltage output with a setting format and outputting the first voltage output to the external load;
    a second voltage supply circuit converting the output electric energy from the MPT circuits into a second voltage output with a setting range and outputting the second voltage output to the external load;
    a third voltage supply circuit converting the output electric energy from the MPT circuits into a third voltage output with the setting range below 0.7V DC and outputting the third voltage output to the external load; and
    a negative voltage supply circuit producing a negative voltage with the setting format and outputting the negative voltage output to the external load;
wherein the phase inverter circuit outputs a phase-inverted voltage to the voltage regulating circuit as the setting voltage.

5. The solar power management system as claimed in claim 4, wherein the multiphase MPT module regulates the output electric energy of the photovoltaic cell module to a maximum power.

6. The solar power management system as claimed in claim 4, wherein the third voltage supply circuit comprises:
    a comparison circuit;
    a finite-state machine;
    a switched-capacitor DC-DC converter, further comprising:
        a first switched capacitor matrix; and
        a second switched capacitor matrix;
wherein the comparison circuit compares a reference voltage with a feedback voltage; the finite-state machine outputs a control signal according to a comparison result from the comparison circuit, so that the switched-capacitor DC-DC converter switches between the first switched capacitor matrix and the second switched capacitor matrix in order to regulate and obtain the third voltage output ranged below 0.7V DC for outputting to the external load.

7. The solar power management system as claimed in claim 6, wherein the finite-state machine controls the switched-capacitor DC-DC converter, so that the first switched capacitor matrix and the second switched capacitor matrix are alternately switched to a charging state or a power supplying state to regulate and obtain the third voltage output ranged below 0.7V DC for outputting to the external load.

* * * * *